US012700885B2

(12) United States Patent
Ying

(10) Patent No.: US 12,700,885 B2
(45) Date of Patent: Aug. 4, 2026

(54) ANTENNA MATCHING METHOD AND APPARATUS, AND MOBILE TERMINAL

(71) Applicant: HUIZHOU TCL MOBILE COMMUNICATION CO., LTD., Huizhou (CN)

(72) Inventor: Fengying Ying, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 305 days.

(21) Appl. No.: 18/689,868

(22) PCT Filed: Aug. 3, 2022

(86) PCT No.: PCT/CN2022/110046
§ 371 (c)(1),
(2) Date: Mar. 7, 2024

(87) PCT Pub. No.: WO2023/045579
PCT Pub. Date: Mar. 30, 2023

(65) Prior Publication Data
US 2024/0297675 A1     Sep. 5, 2024

(30) Foreign Application Priority Data

Sep. 24, 2021    (CN) .......................... 202111120353.1

(51) Int. Cl.
*H04B 1/3827*        (2015.01)
*H04B 1/401*         (2015.01)
(Continued)

(52) U.S. Cl.
CPC ........... *H04B 1/3838* (2013.01); *H04B 1/401* (2013.01); *H04M 1/72454* (2021.01); *H04B 7/0608* (2013.01); *H04B 7/0802* (2013.01)

(58) Field of Classification Search
CPC .... H04B 1/3838; H04B 1/401; H04B 7/0608; H04B 7/0802; H04B 1/0458; H04M 1/72454
(Continued)

(56) References Cited

U.S. PATENT DOCUMENTS

| | | | | |
|---|---|---|---|---|
| 2014/0309867 A1* | 10/2014 | Ricci | ..................... | G06F 16/951 |
| | | | | 701/36 |
| 2017/0090582 A1* | 3/2017 | Ganesan | ............... | G06F 40/177 |

(Continued)

FOREIGN PATENT DOCUMENTS

| | | | | |
|---|---|---|---|---|
| CN | 101562460 A | 10/2009 | | |
| CN | 102934467 A * | 2/2013 | ............ | H04W 4/021 |

(Continued)

OTHER PUBLICATIONS

International Search Report in International application No. PCT/CN2022/110046, mailed on Oct. 26, 2022.
(Continued)

*Primary Examiner* — Mahendra R Patel
(74) *Attorney, Agent, or Firm* — PV IP PC; Wei Te Chung

(57)        ABSTRACT

The present disclosure relates to an antenna matching method and apparatus, and mobile terminal. The antenna matching method comprises: determining whether the mobile terminal is currently in a communication state based on status information; in response to determining that an operation mode of the mobile terminal in the communication state is a first operation mode, obtaining gesture data of a user for the mobile terminal by using a sensor detection module; and selecting a target antenna corresponding to the holding gesture state from a plurality of antennas based on holding gesture state corresponding to the gesture data. Therefore, free switching of the antennas is achieved.

11 Claims, 5 Drawing Sheets

(51) Int. Cl.

| | |
|---|---|
| *H04B 7/06* | (2006.01) |
| *H04B 7/08* | (2006.01) |
| *H04M 1/72454* | (2021.01) |

(58) Field of Classification Search
USPC ...................................................... 455/552.1
See application file for complete search history.

(56) References Cited

U.S. PATENT DOCUMENTS

| | | | | |
|---|---|---|---|---|
| 2017/0164291 A1* | 6/2017 | Ludwig | ................... | H04W 4/80 |
| 2017/0187438 A1* | 6/2017 | Liu | ...................... | H04B 7/0608 |

FOREIGN PATENT DOCUMENTS

| | | | | | |
|---|---|---|---|---|---|
| CN | 106385474 | A | | 2/2017 | |
| CN | 106453963 | A | | 2/2017 | |
| CN | 106470262 | A | | 3/2017 | |
| CN | 106953979 | A | * 7/2017 | .............. | H01Q 3/24 |
| CN | 107463329 | A | * 12/2017 | ......... | G06F 3/04883 |
| CN | 108108015 | A | * 6/2018 | ........... | G06F 3/0346 |
| CN | 108418969 | A | 8/2018 | | |
| CN | 108429575 | A | * 8/2018 | ........ | H04M 1/72454 |
| CN | 110187767 | A | * 8/2019 | ........... | A61B 5/1122 |
| CN | 110348275 | A | * 10/2019 | ............ | G06F 3/017 |
| CN | 110971742 | A | 4/2020 | | |
| CN | 113541721 | A | * 10/2021 | ............ | H04B 1/401 |
| CN | 113766063 | A | 12/2021 | | |
| KR | 20160003103 | A | * 1/2016 | ........ | H04M 1/72552 |
| RU | 2623805 | C2 | * 6/2017 | ............ | G06F 1/163 |
| WO | 2015037401 | A1 | 3/2015 | | |
| WO | WO-2016145885 | A1 | * 9/2016 | ........... | H04B 7/0602 |
| WO | WO-2019019835 | A1 | * 1/2019 | ......... | G06F 3/04883 |

OTHER PUBLICATIONS

Written Opinion of the International Search Authority in International application No. PCT/CN2022/110046,mailed on Oct. 26, 2022.
1st Chinese Office Action issued in corresponding Chinese Patent Application No. 202111120353.1 dated Nov. 10, 2022, pp. 1-9.
2nd Chinese Office Action issued in corresponding Chinese Patent Application No. 202111120353.1 dated Apr. 20, 2023, pp. 1-8.

* cited by examiner

ANTENNA MATCHING METHOD AND APPARATUS, AND MOBILE TERMINAL

TECHNICAL FIELD

The present disclosure relates to a field of mobile terminals, and more particularly, to an antenna matching method and apparatus, and a mobile terminal.

BACKGROUND

With the development of wireless communication technology, mobile terminal devices such as mobile phones have become an indispensable part of people's life. In the use of the mobile terminal, the performance of the antenna directly affects the quality of the wireless communication of the mobile terminal.

Technical Problems

Currently, in the wireless communication of the mobile terminal, the inventors have found that an antenna in the mobile terminal may be affected by a substance, particularly a conductive substance, surrounding the mobile terminal. For example, when the mobile terminal approaches the human body or other medium, the current and field distribution on the antenna in the mobile terminal may be changed due to changes in the direction map and impedance of the antenna, resulting in the change of the resonant frequency of the antenna. Further, when the user holds the mobile terminal in different states, the quality of the signals received by the antenna in the mobile terminal is sometimes good and sometimes poor, which affects the communication quality.

Technical Solutions

Accordingly, it is necessary to provide antenna matching method and apparatus, and a mobile terminal for improving poor communication quality of a mobile terminal.

An antenna matching method is applied to a mobile terminal including a plurality of antennas. The antenna matching method includes:

obtaining status information of the mobile terminal, and determining whether the mobile terminal is currently in a communication state based on the status information;

in response to determining that the mobile terminal is in the communication state, determining an operation mode of the mobile terminal in the communication state;

in response to determining that the operation mode of the mobile terminal in the communication state is a first operation mode, obtaining gesture data of a user for the mobile terminal by using a sensor detection module;

determining a holding gesture state of the user for the mobile terminal based on the gesture data; and selecting a target antenna corresponding to the holding gesture state from the plurality of antennas based on the holding gesture state of the user for the mobile terminal.

An antenna matching apparatus includes:

a first obtaining module, configured to obtain status information of the mobile terminal, and determining whether the mobile terminal is currently in a communication state based on the status information;

a first determining module, configured to determine an operation mode of the mobile terminal in the communication state, in response to determining that the mobile terminal is in the communication state;

a second obtaining module, configured to obtain gesture data of a user for the mobile terminal by using a sensor detection module, in response to determining that the operation mode of the mobile terminal in the communication state is a first operation mode;

a second determining module, configured to determine a holding gesture state of the user for the mobile terminal based on the gesture data; and a first matching module, configured to select a target antenna corresponding to the holding gesture state from the plurality of antennas based on the holding gesture state of the user for the mobile terminal.

A mobile terminal includes a memory storing a computer program and a processor. The processor, when executing the computer program, performs the operations of:

obtaining status information of the mobile terminal, and determining whether the mobile terminal is currently in a communication state based on the status information;

in response to determining that the mobile terminal is in the communication state, determining an operation mode of the mobile terminal in the communication state;

in response to determining that the operation mode of the mobile terminal in the communication state is a first operation mode, obtaining gesture data of a user for the mobile terminal by using a sensor detection module;

determining a holding gesture state of the user for the mobile terminal based on the gesture data; and selecting a target antenna corresponding to the holding gesture state from the plurality of antennas based on the holding gesture state of the user for the mobile terminal.

Beneficial Effects

In the present embodiment, status information of the mobile terminal is obtained and it is determined whether the mobile terminal is currently in a communication state based on the status information. In response to determining that the mobile terminal is in the communication state, an operation mode of the mobile terminal is in the communication state is determined. In response to determining that the operation mode of the mobile terminal in the communication state is a first operation mode, detection information is obtained by using a sensor detection module. A holding gesture state of the user for the mobile terminal is determined based on the gesture data. A target antenna corresponding to the holding gesture state is selected from the plurality of antennas based on the holding gesture state of the user for the mobile terminal. By first determining whether the current operation mode of the mobile terminal is in the communication state, and then identifying the current holding gesture state of the user for the mobile terminal when the mobile terminal is in the communication state, to obtain the optimal target antenna, so that the antennas may be freely switched, and the communication rate and quality may be further improved.

DETAILED DESCRIPTION

In order to make the objects, technical solutions and advantages of the present disclosure more clear, the present disclosure is further described in detail in combination with the following drawings and embodiments. It should be understood that the specific embodiments described herein are merely intended to explain the present disclosure and are not intended to limit the present disclosure.

Figure 1:
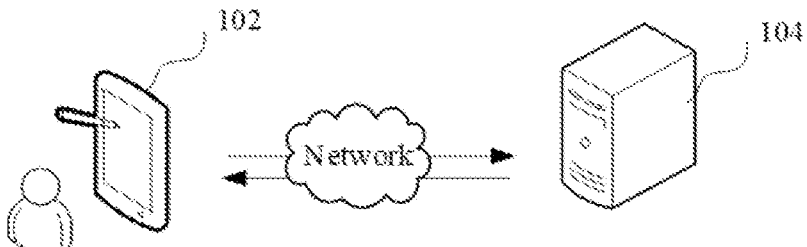
FIG. 1 is an application environment for an antenna matching method according to an embodiment of the present disclosure.

An antenna matching method according to the present disclosure may be applied to the application environment shown in FIG. 1. The mobile terminal 102 communicates with the server 104 through a network to address poor communication quality of mobile terminal. The mobile terminal 102 may be, but is not limited to, a variety of personal computers, notebook computers, smartphones, tablet computers, and portable wearable devices. The server 104 may be implemented as a separate server or a cluster of servers.

Figure 2:
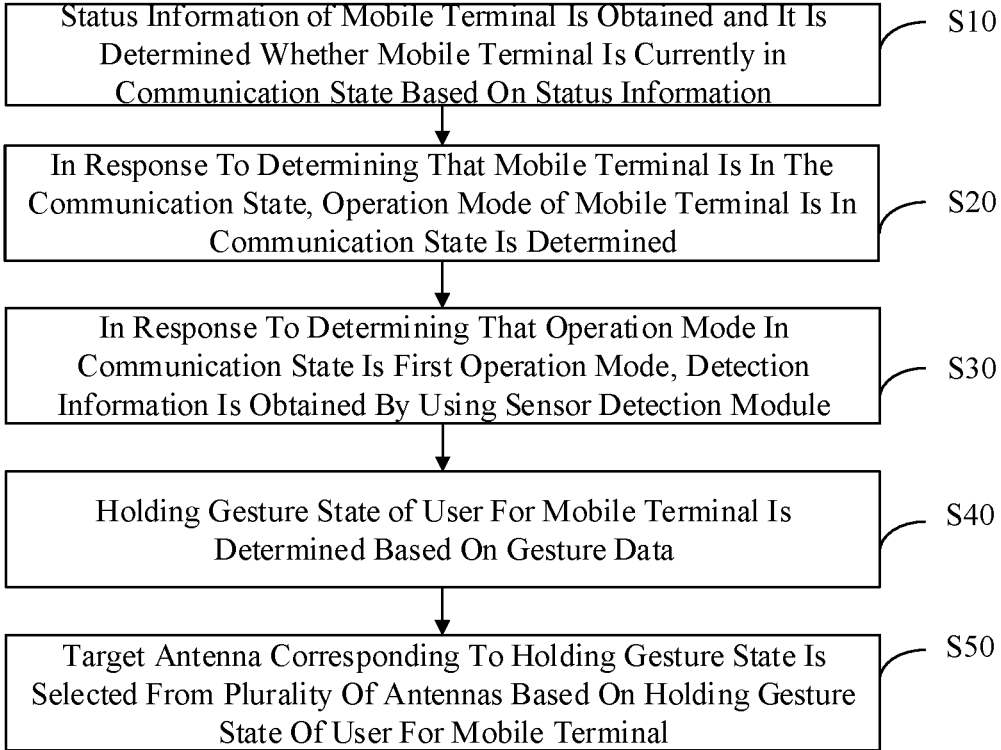
FIG. 2 is a flowchart of an antenna matching method according to an embodiment of the present disclosure.

In an embodiment, as shown in FIG. 2, an antenna matching method is provided. An example of applying the antenna matching method to a mobile terminal in FIG. 1 is described. The mobile terminal includes a plurality of antennas. The antenna matching method includes the following steps S10-S50.

At Step S10, status information of the mobile terminal is obtained and it is determined whether the mobile terminal is currently in a communication state based on the status information.

The status information of the mobile terminal is information indicating the current status of the mobile terminal. The obtained state information may be used to determine the current operation state of the mobile terminal, that is, whether the mobile terminal is currently in the communication state, a video playing state, or a standby state. It should be noted that in the present embodiment, the status information of the mobile terminal is obtained mainly to determine whether the mobile terminal is currently in a communication state based on the status information.

In an embodiment, the status information of the mobile terminal may be obtained by directly detecting the type of the application program in which foreground of the mobile terminal is running to determine the current operating status of the mobile terminal. The application program may include a play software type application program, for example, a iQIYl video player, a Tencent video player, a watermelon video player, a Youku video player, or the like. Further, the application program may include a communication software type application program, such as telephone calls, WeChat, QQ, etc. The application program may further include other types of software, for example, common software such as Amap, Ele.me, or Meituan to obtain status information of the mobile terminal. If it is detected that the iQIYl video player is running in the foreground of the mobile terminal, it may be determined that the mobile terminal is currently in the video playing state. If it is detected that the application program running in the foreground of the mobile terminal is a telephone call, it may be determined that the mobile terminal is currently in the communication state.

In an embodiment, the status information of the mobile terminal may be obtained by monitoring page operation behavior of the user at the mobile terminal. It is possible to monitor the user's page operation behavior at the mobile terminal in real time by providing a monitoring script plug-in at the mobile terminal. The monitoring script plug-in refers to a plug-in into which a js monitoring file script is inserted, and the js monitoring file refers to a segment of js monitoring code, and refers to a function of binding a monitoring event on the <body> label of the global dom document. In addition, for the js file common to the item, the js monitoring file may be directly imported on the page of the mobile terminal, to monitor the operation behavior of the user on the mobile terminal. In this step, the script may be used as a carrier of the js monitoring file, and since the script has a functional feature that may be temporarily invoked and executed by the application, it is more convenient to monitor the use of the script plug-in. Upon the monitoring script plug-in monitoring the operation behavior of the user on the mobile terminal, the monitoring script plug-in responds to the page operation behavior of the user, to obtain the status information of the mobile terminal and to determine whether the mobile terminal is currently in the communication state based on the status information. If the page operation behavior of the user at the mobile terminal is dialing a number or answering a call, it may be determined that the mobile terminal is currently in the communication state.

At Step S20, in response to determining that the mobile terminal is in the communication state, an operation mode of the mobile terminal is in the communication state is determined.

The communication state is further divided into a hands-free call mode, an headset call mode, a handheld call mode, and the like. Therefore, in the present embodiment, after it is determined that the mobile terminal is in the communication state, it is further determined whether the communication state in which the mobile terminal is currently in is the hands-free call mode, the headset call mode, or the handheld call mode.

S30: in response to determining that the operation mode of the mobile terminal in the communication state is a first operation mode, detection information is obtained by using a sensor detection module.

The first operation mode is a handheld call mode indicating that the current mobile terminal is in the communication state. The handheld call mode includes an answering mode and a dialing mode. It should be noted that the handheld call mode may be a handheld call mode in the telephone call program, a handheld call mode in the WeChat program, or a handheld call mode in the QQ program.

The sensor detection module in the mobile terminal is triggered to obtain the detection information in response to determining that the mobile terminal is in the handheld call mode in the communication state. The sensor detection module may be an action sensor, an acceleration sensor or a gyroscope sensor, or a combination of the above sensors. The sensor detection module may be configured to detect whether the operation of the user on the mobile terminal is in a specific holding state. In the present embodiment, it is detected by the sensor detection module whether or not the user brings the mobile terminal close to the ear of the user, and when the mobile terminal is close to the ear of the user, the sensor detection module may determine the holding gesture of the user for holding the mobile terminal.

In an embodiment, may be based on the current tilted angle of the mobile terminal, and the current holding gesture of the mobile terminal may be determined according to the current tilted angle of the mobile terminal, to obtain gesture data of the user for the mobile terminal. That is, in the present disclosure, the holding state may be determined according to the tilted angle of the mobile terminal. A sensor detection module (e.g., a gyroscope sensor) in the mobile terminal may configured to detect a current tilted angle of the mobile terminal as gesture data. The holding gesture state of a user for holding the mobile terminal is determined based on the tilted angle.

In an actual application, when the user holds a mobile terminal, a force is applied to an edge touch region of the mobile terminal. When different holding gestures are used, the position distributions of the touch operations are different. Therefore, in an embodiment, the current holding gesture may be determined by the touch position of the current touch operation in the edge touch region, to obtain gesture data of the user for the mobile terminal. The edge touch region may be a touch region at the left and/or right sides of the electronic device, or may be a left and/or right edge region of the front touch screen of the electronic device. Therefore, the pressure information of the touch operation detected by the sensor detection module (e.g., a pressure sensor) in the touch regions at the left and/or right sides of the mobile terminal may be used as the detection information for characterizing the touch position, that is, the region or position in which the current touch operation is located, to realize the pressure signal value detected by the pressure sensor.

At Step S40, a holding gesture state of the user for the mobile terminal is determined based on the gesture data.

The holding gesture state of the user holding the mobile terminal is determined based on the gesture data. That is, it is determined whether the right hand or the left hand is used when the user holds the mobile terminal. In a practical application, since the human body is a conductor, when the user's holding gesture states for the mobile terminal are different, the influences of the user on the antenna resonance in the mobile terminal are different. For example, the influence of the user on the antenna resonance of the mobile terminal when the left hand of the user holds the mobile terminal is different from the influence of the user on the antenna resonance of the mobile terminal when the right hand of the user holds the mobile terminal. Therefore, in the present embodiment, after obtaining the gesture data of the user for the mobile terminal by using the sensor detection module, it is determined from the gesture data whether the right hand or the left hand of the user is used for the current holding gesture of the mobile terminal.

At Step S50, a target antenna corresponding to the holding gesture state is selected from the plurality of antennas based on the holding gesture state of the user for the mobile terminal.

After the holding gesture state of the user for the mobile terminal is determined, that is, after determining that the right hand or the left hand of the user is used for the current holding gesture of the mobile terminal, the target antenna corresponding to the holding gesture state is selected from the plurality of antennas of the mobile terminal. In an embodiment, the antenna corresponding to the left-hand mode and the antenna corresponding to the right-hand mode have been predetermined and associated in advance. The target antenna corresponding to the holding gesture state is directly selected from the plurality of antennas of the mobile terminal after determining that the right hand or the left hand of the user is used for the current holding gesture of the mobile terminal.

In an embodiment, since there may be more than one case of selecting a target antenna corresponding to the holding gesture state from the plurality of antennas based on the holding gesture state of the user for the mobile terminal. Therefore, in order to improve quality of the signal received when a target antenna corresponding to the holding gesture state is selected. After the target antenna corresponding to the holding gesture state is selected from the plurality of antennas based on the holding gesture state of the user for the mobile terminal, an antenna that does not conform to the communication type may be filtered out from the target antenna corresponding to the holding gesture state according to the current communication type, and then the final matched target antenna is further selected from the conform to the communication type, and finally the antenna currently used by the mobile terminal is switched to the final matched target antenna. The communication types may include Bluetooth, WIFI, 5G, 4G, 3G, or the like.

In the present embodiment, status information of the mobile terminal is obtained and it is determined whether the mobile terminal is currently in a communication state based on the status information. In response to determining that the mobile terminal is in the communication state, an operation mode of the mobile terminal is in the communication state is determined. In response to determining that the operation mode of the mobile terminal in the communication state is a first operation mode, detection information is obtained by using a sensor detection module. A holding gesture state of the user for the mobile terminal is determined based on the gesture data. A target antenna corresponding to the holding gesture state is selected from the plurality of antennas based on the holding gesture state of the user for the mobile terminal. By first determining whether the current operation mode of the mobile terminal is in the communication state, and then identifying the current holding gesture state of the user for the mobile terminal when the mobile terminal is in the communication state, to obtain the optimal target antenna, so that the antennas may be freely switched, and the communication rate and quality may be further improved.

Figure 3:
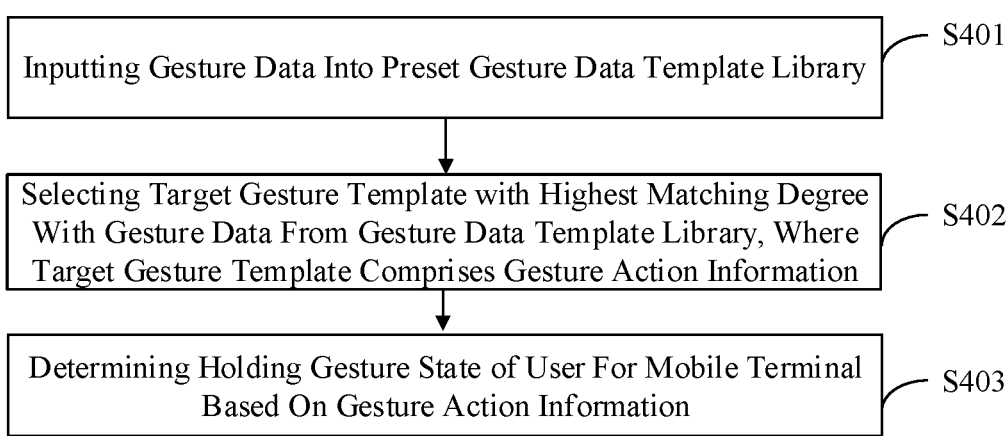
FIG. 3 is a flowchart of an antenna matching method according to an embodiment of the present disclosure.

In an embodiment, as shown in FIG. 3, the determining of the holding gesture state of the user for the mobile terminal based on the gesture data including the following steps S401-S403.

At Step S401, the gesture data is input into a preset gesture data template library.

The gesture data template library is a pre-created database for storing gesture data. Several different sample gesture data are stored in the gesture database. Since the gesture data includes the current holding gesture of the user for the mobile terminal, after obtaining the gesture data, the gesture data is input to the preset gesture database to select the target gesture template with the highest matching degree with the gesture data from the gesture database.

At Step S402, a target gesture template having highest matching degree with the gesture data is selected from the gesture data template library. The target gesture template includes gesture action information.

The gesture data is input to the gesture data template library, and then online matching is performed, so that the target gesture template with highest matching degree with the gesture data is selected from the gesture data template library. The target gesture template refers to a template having the highest matching degree with the holding gesture in the gesture data. The gesture data gesture template includes the gesture action information. The gesture action information refers to information that may be used to evaluate current holding gesture action of the user for the mobile terminal.

In the present embodiment, the target gesture template having highest matching degree with the gesture data is selected from the gesture data template library by using a similarity algorithm. The similarity algorithm includes an algorithm for calculating the similarity between two objects. The similarity algorithm may include a text similarity algorithm, a cosine similarity algorithm, or an edit distance algorithm. The similarity algorithm may calculate the similarity between the two vectors. Therefore, feature extraction needs to be performed on the gesture data in advance to obtain the gesture features in the gesture data. The gesture features and the gesture action feature in each gesture template are converted into a vector $A=(A1, A2, \ldots, An)$ and a vector $B (B1, B2, \ldots, Bn)$. The similarity between the gesture feature and the gesture action feature in each gesture template is calculated by using the similarity algorithm. The calculated gesture template with the highest similarity with the gesture features is used as the target gesture template with the highest matching degree.

At Step S403, the holding gesture state of the user for the mobile terminal is determined based on the gesture action information.

The holding gesture state of the user for the mobile terminal is determined based on the gesture action feature in the target gesture template. That is, it is determined whether the right hand or the left hand is used when the user holds the mobile terminal.

In the present embodiment, the gesture data is input into a preset gesture data template library. A target gesture template having highest matching degree with the gesture data is selected from the gesture data template library. The target gesture template includes gesture action information. The holding gesture state of the user for the mobile terminal is determined based on the gesture action information. Therefore, it is realized that the holding gesture state of the user for the mobile terminal may be quickly and accurately determined, and efficiency of subsequently selecting a corresponding target antenna from a plurality of antennas may be improved.

In an embodiment, the antenna matching method further includes: after determining a current operation mode of the mobile terminal in the communication state based on the status information, in response to determining that the operation mode of the mobile terminal in the communication state is a second operation mode, selecting a default antenna corresponding to an operation mode of the mobile terminal from the plurality of antennas based on the operation mode of the mobile terminal.

The second operation mode is a non-handheld call mode indicating that the current mobile terminal is in the communication state. For example, the hands-free call mode or the headset call mode in the communication state are classified as the second operation mode. That is, the non-handheld call mode in which the mobile terminal is currently in the communication state is determined as the second operation mode of the mobile terminal.

In response to determining that the operation mode of the mobile terminal in the communication state is a second operation mode, selecting a default antenna corresponding to a communication type of the mobile terminal from the plurality of antennas based on the communication type of the mobile terminal. The default antenna is an antenna that is set in advance and is related to the communication type of the mobile terminal regardless of whether the user is in handheld call mode. In the present embodiment, in order to improve the signal quality in the second operation mode in which the mobile terminal is in the communication state, a default antenna conform to the communication type may be selected according to the current communication type of the mobile terminal. The communication types may include Bluetooth, WIFI, 4G, 3G, 2G, or the like. For example, if the current communication type of the mobile terminal is 4G, the corresponding default antenna is matched according to the communication type information 4G. In an embodiment, corresponding antennas default-connected are different when the mobile terminal is in different communication types. Therefore, when the communication type is determined, the default antenna corresponding to the communication type may be directly matched, so that the signal quality in the second operation mode in which the mobile terminal is in the communication state may be improved.

Figure 4:
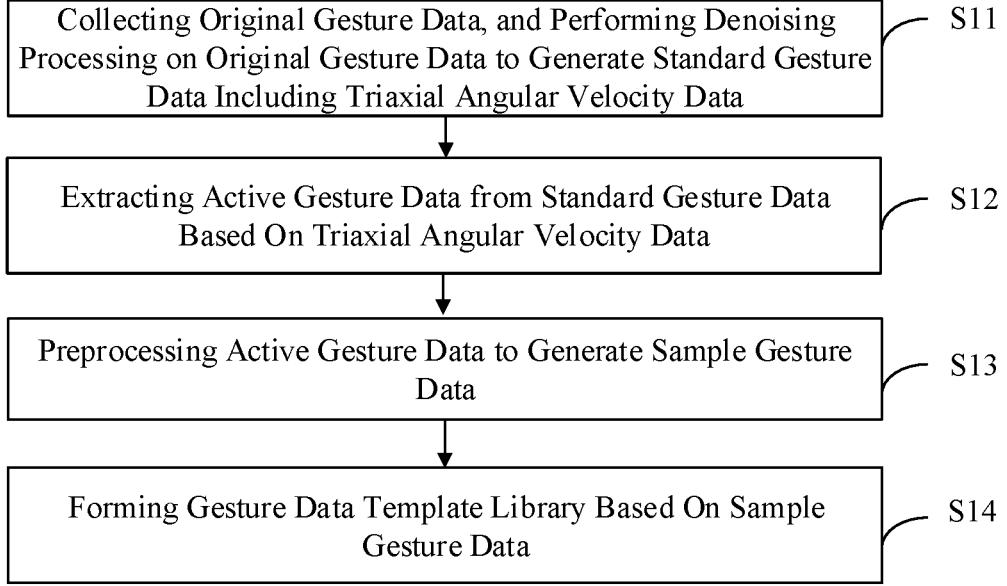
FIG. 4 is a flowchart of an antenna matching method according to an embodiment of the present disclosure.

In an embodiment, as shown in FIG. 4, before determining the holding gesture state of the user for the mobile terminal based on the gesture data, the antenna matching method further includes Steps S11-S14.

At Step S11, original gesture data is obtained, and denoising processing is performed on the original gesture data to generate standard gesture data. The standard gesture data includes triaxial angular velocity data.

The original gesture data is data including a gesture state in which the user handheld mobile terminal performs communication in advance. In an embodiment, a mobile terminal with a gyroscope sensor, a test board, or other electronic equipment may be used in advance to obtain a hand-held gesture of the user when using the mobile terminal. Alternatively, the original gesture data may be obtained directly from the gesture database of the users hand-held mobile terminal disclosed by the Internet or a third party mechanism/platform. For example, when the user performs an action gesture, triaxial angular velocity data of a gyroscope disposed within the mobile terminal during this period of time is collected, and the sampling frequency is 50 Hz. Assuming that $a=(x, y, z)$ represents the triaxial angular velocity of the mobile terminal, the triaxial angular velocity at time t is $at=(xt, yt, zt)$, and the data sequence obtained for a period of time is $A=(A1, A2, \ldots, An)$, n is the number of data collected.

In an embodiment, there may be a larger noise in the obtained original gesture data, for example, gesture data obtained when the user is not in the communication state, or gesture data of the user in the communication state, which does not meet the requirements (for example, gesture data of the user in the earphone communication mode). Therefore, in order to improve the accuracy of the sample gesture data in the finally generated gesture data template library, after the original gesture data is obtained, the original gesture data needs to be de-noised first, that is, the gesture data of the user for the hand-held terminal in the non-communication state is removed to generate the standard gesture data. The standard gesture data is gesture data of the user for the handheld terminal in which is in a communication state.

At Step S12, active gesture data is extracted from the standard gesture data based on the triaxial angular velocity data.

To recognize action gestures, it is necessary to first accurately recognize the start and end of gestures to extract active gesture data. When the gesture action is performed, the triaxial angular velocity data of the mobile terminal changes significantly. When the gesture action is not performed, the data is relatively stable and substantially unchanged. Since the variance may reflect the change of the data over a period of time, the start and end of the gesture data is determined and the gesture data is extracted according to the mean square error of the angular velocity data. The formula for calculating the mean square error var is as follows:

$$var = \frac{\sum_{i=1}^{N}(x_i - \overline{x})^2 + (y_i - \overline{y})^2 + (z_i - \overline{z})^2}{N}.$$

Where N is the number of data for calculating the mean square error, $\overline{x}$, $\overline{y}$, $\overline{z}$ are the mean values of the angular velocities of the x, y, and z axes, respectively. When var is greater than or equal to the action gesture start threshold, i.e., var≥varbegin, the gesture action is regarded to be started. When var is less than or equal to the action gesture end threshold, that is, var≤varend, the gesture action is regarded to be end.

Further, noise generated by a user's misoperation or hand shaking is regarded as gesture data during the extracting of the gesture data. Therefore, in order to remove these interference noises, the mean square error var being greater than varbegin (that is, the gesture start duration threshold value) Nbegin times consecutively is regarded that the gesture action is regarded to be started greater than varbegin, so that the noise data generated by the shaking is not regarded as active data, thereby effectively improving the accuracy of the extracted valid gesture data.

At Step S13, the active gesture data is preprocessed to generate sample gesture data.

In the present embodiment, the preprocessing of the active gesture data includes: smoothing the active gesture data; normalizing the smoothed active gesture data; performing cubic spline interpolation processing on normalized active gesture data; and performing false peak and valley processing on the active gesture data processed by the cubic spline interpolation processing to generate the sample gesture data.

At Step S14, a gesture data template library is formed based on the sample gesture data.

The gesture data template library stores herein the final data template for respective action gestures. A plurality of gesture data sequences are collected for the same action gesture. The active gesture data is extracted and preprocessed. One of the plurality of data sequences for the same gesture is randomly selected as a temporary gesture template. The remaining data sequences for the same gesture are DTW matched with the temporary gesture template in sequence, and the sum of the similarities is calculated. The calculation method is as follows: assuming that the temporary gesture template is R=(r1, r2, . . . , rn), the gesture data sequence is T=(t1, t2, . . . , tm), the similarity between the data ri in R and the data tj in T is expressed as the Euclidean distance dij between ri and tj, and the similarity Dij between the first i data in R and the first j data in T is calculated as:

$$D_{ij} = d_{ij} + \min \begin{cases} D_{i-1,j} \\ D_{i,j-1} \\ D_{i-1,j-1} \end{cases}$$

Dij is the similarity between the temporary gesture template R and the gesture data sequence T. The similarity between the temporary gesture template R and all of the data sequences for the same gesture is calculated and summated, to obtain the similarity sum. The above operations are repeated on each of the plurality of data sequences for the same gesture to obtain a similarity sum of the data sequence related to other data sequences. A data sequence with the largest similarity sum, that is, a data sequence with the smallest Dnm, is selected as a final template of the gesture. The above operations are repeated for all the sample gesture data so as to establish a gesture data template library.

In the present embodiment, original gesture data is obtained, and denoising processing is performed on the original gesture data to generate standard gesture data. The standard gesture data includes triaxial angular velocity data. Active gesture data is extracted from the standard gesture data based on the triaxial angular velocity data. The active gesture data is preprocessed to generate sample gesture data. A gesture data template library is formed based on the sample gesture data. By collecting a large amount of original gesture data in advance, and then performing data processing on the original gesture data to form a gesture data template library, it is convenient to subsequently directly select the desired target gesture template by using the gesture data template library, thereby improving the efficiency of data processing and further improving the communication rate.

Figure 5:
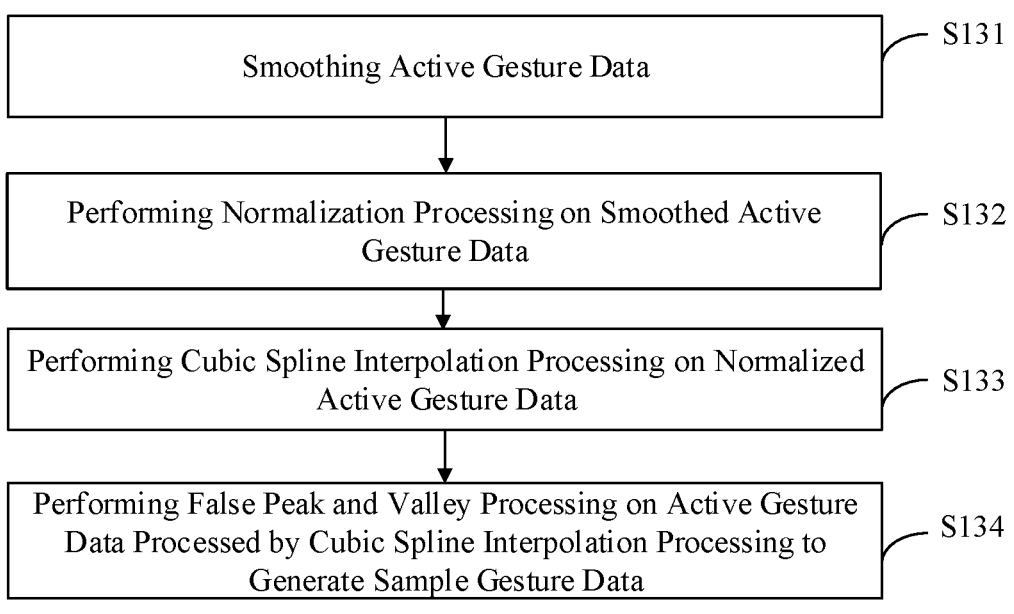
FIG. 5 is a flowchart of an antenna matching method according to an embodiment of the present disclosure.

In an embodiment, as shown in FIG. 5, the preprocessing of the active gesture data to generate sample gesture data includes Steps S131-S134.

At Step S131, the active gesture data is smoothed.

Due to the slight shaking of the hand and the inaccuracy of the sensor itself, the collected active gesture data has a certain noise, which affects the recognition accuracy. In an embodiment of the present embodiment, the angular velocity data in the active gesture data subjected to gesture extraction is smoothed by using a simple sliding average algorithm, to remove noise. Assuming that data subjected to gesture extraction is A=(a1, a2, . . . , am). If the sliding window size is M, the smoothed i-th data is:

$$\hat{a}_i = \frac{1}{M} \sum_{j=1-M+1}^{i} a_j$$

At Step S132, normalization processing is performed on smoothed active gesture data.

Further, due to the difference of gestures made by the user, the amplitudes of the gestures are different when different users make the same gestures, which greatly affects the recognition accuracy. Therefore, in an embodiment of the present disclosure, data normalization processing is performed after the angular velocity data is smoothed. Assume that X=(x1, x2, . . . , xm), Y=(y1, y2, . . . , ym) and Z=(z1, z2, . . . , zm) representing angular velocity data of (x, y, z) axes, respectively. The data normalization processing is as follows:

$$\begin{cases} \dot{x}_i = \dfrac{2 \cdot (x_i - \min(X))}{\max(X) - \min(X)} - 1 \\ \dot{y}_i = \dfrac{2 \cdot (y_i - \min(Y))}{\max(Y) - \min(Y)} - 1 \\ \dot{z}_i = \dfrac{2 \cdot (x_i - \min(Z))}{\max(Z) - \min(Z)} - 1 \end{cases}$$

The normalized data is as follows:

$\dot{X}=(\dot{x}_1, \overline{x}_2, \ldots, \dot{x}_m)$, $\dot{Y}=(\dot{y}_1, \dot{y}_2, \ldots, \dot{y}_m)$ and $\dot{Z}=(\dot{z}_1, \dot{z}_2, \ldots, \dot{z}_m)$.

At Step S133, cubic spline interpolation processing is performed on normalized active gesture data.

since the adopted action gesture recognition algorithm requires the data waveform of the action gesture to be monotonous in the segmentation area, it is necessary to perform the cubic spline interpolation segmentation fitting processing on the action gesture data. Assume that the angular velocity data sequence is A=(a1, a2, . . . , am), Δ:a1=x0<x1< . . . <xk=am is equidistantly divided on [a1, am], and the fitting formula is:

$$s_3(x) = b_0 + b_1 x + \frac{b_2}{2!}x^2 + \frac{b_3}{3!}x^3 + \sum_{j=1}^{k-1}(x - x_j)^3 \in S_p(\Delta, 3)$$

$$(x - x_j)^3 = \begin{cases} 0 & x < x_j \\ (x - x_j)^3 & x \ge x_j \end{cases} (j = 1, 2, \ldots, n-1)$$

At Step S134, false peak and valley processing is performed on the active gesture data processed by the cubic spline interpolation processing to generate the sample gesture data.

There are false peak and valley in the active gesture data, they need to be recognised and processed. Three consecutive peaks (or valleys) are first determined, such as p1, p2, and p3. If |p1−p2|>pthreshold and |p2−p3|>pthreshold, pthreshold is a false peak and valley threshold, it is regarded that there are false peaks or valleys p2. Two points qi and qi are taken at both sides of p2, respectively, and the mean of qi and qj is used as the value of p2. The mean values of p2 and p1 is taken to obtain the value of a first point of points from p1 to p2, and the mean values of the point and p2 is taken to obtain the values of the second point of the points from p1 to p2, and so on. The values of all points between p1 and p2 are obtained. All values between p2 and p3 are obtained in the same manner. Processing is completed, thereby generating a gesture data sample.

In an embodiment, the active gesture data is smoothed. Normalization processing is performed on smoothed active gesture data. The cubic spline interpolation processing is performed on normalized active gesture data. False peak and valley processing is performed on the active gesture data processed by the cubic spline interpolation processing to generate the sample gesture data. There are false peak and valley in the active gesture data, they need to be recognised and processed. Therefore, validity and accuracy of the generated sample gesture data may be improved.

Figure 6:
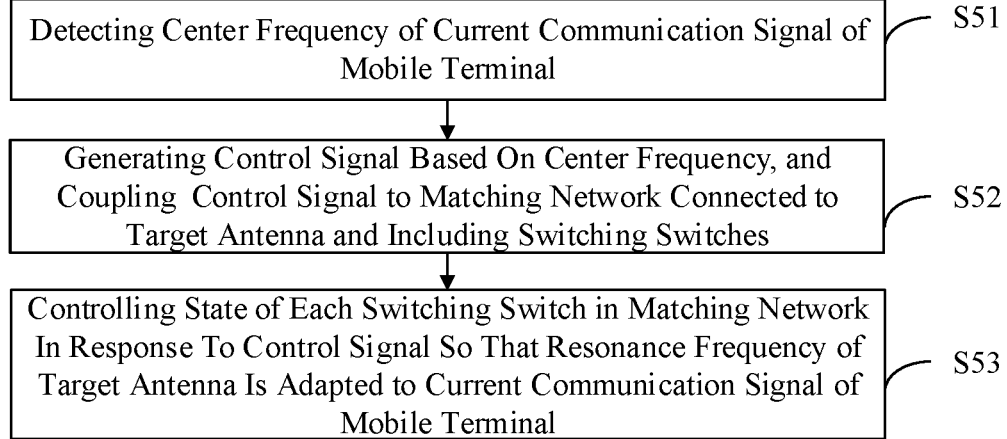
FIG. 6 is a flowchart of an antenna matching method according to an embodiment of the present disclosure.

In an embodiment, as shown in FIG. 6, the mobile terminal further includes a matching network connected to the target antenna. After generating the sample gesture data and selecting the target antenna corresponding to the holding gesture state from the plurality of antennas based on the holding gesture state of the user for the mobile terminal, the antenna matching method further includes Step S51-S53.

At Step S51, a center frequency of a current communication signal of the mobile terminal is detected.

When the communication signal of the mobile terminal is a single-frequency signal, the mobile terminal may directly measure the signal frequency of the single-frequency signal by using a frequency meter, and the size of the signal frequency is equal to that of the center frequency. When the communication signal of the mobile terminal is an electromagnetic wave signal having a complex frequency spectrum, the mobile terminal may perform spectrum analysis on the electromagnetic wave signal of the complex frequency spectrum by using a spectrum analyzer, and then obtain a center frequency of the communication signal.

At Step S52, a control signal is generated based on the center frequency, and the control signal is coupled to a matching network connected to the target antenna. The matching network includes a plurality of switching switches.

At Step S53, a state of each switching switch in the matching network is controlled in response to the control signal so that a resonance frequency of the target antenna is adapted to the current communication signal of the mobile terminal.

The matching network is a network for adjusting the resonance frequency of the target antenna. The matching network includes a plurality of resonant paths connected in parallel. Each resonant path includes a switching switch and a corresponding LC series resonant circuit. Each LC series resonant circuit includes a capacitor and an inductor connected in series. By controlling the state of the switching switch of each resonance path in the matching network, the impedance of the matching network may be adjusted to adjust the resonance frequency of the target antenna.

Since the control signal is a signal generated based on the center frequency of the communication signal and configured to control the switching switch in the matching network connected to the target antenna, the control signal is used for controlling the state of the switching switch in each resonance path in the matching network by coupling the control signal to the matching network connected to the target antenna, so that the resonance impedance of the matching network is adjusted so that the resonance frequency of the target antenna is the same as the center frequency of the communication signal. The resonance frequency of the target antenna is ensured to be adapted with the current communication signal of the mobile terminal.

In the present embodiment, a center frequency of a current communication signal of the mobile terminal is detected. A control signal is generated based on the center frequency, and the control signal is coupled to a matching network connected to the target antenna. The matching network includes a plurality of switching switches. A state of each switching switch in the matching network is controlled in response to the control signal so that a resonance frequency of the target antenna is adapted to the current communication signal of the mobile terminal. After determining the target antenna, the resonance frequency of the target antenna is adjusted so that the resonance frequency of the target antenna is adapted to the current communication signal of the mobile terminal, thereby further improving the quality of the communication signal.

It should be understood that although steps in the flow-chart in FIGS. 2-6 are sequentially shown as indicated by arrows, these steps are not necessarily sequentially performed as indicated by arrows. Unless explicitly stated herein, the orders of these steps is not strictly limited, and these steps may be performed in other orders. Further, at least a portion of the steps in FIGS. 2-6 may include a plurality of sub-steps or a plurality of stages, which are not necessarily performed at the same time, but may be performed at different times. The sub-steps or stages are not necessarily performed sequentially, but may be performed alternately with other steps or at least a portion of the sub-steps or stages of other steps.

Figure 7:
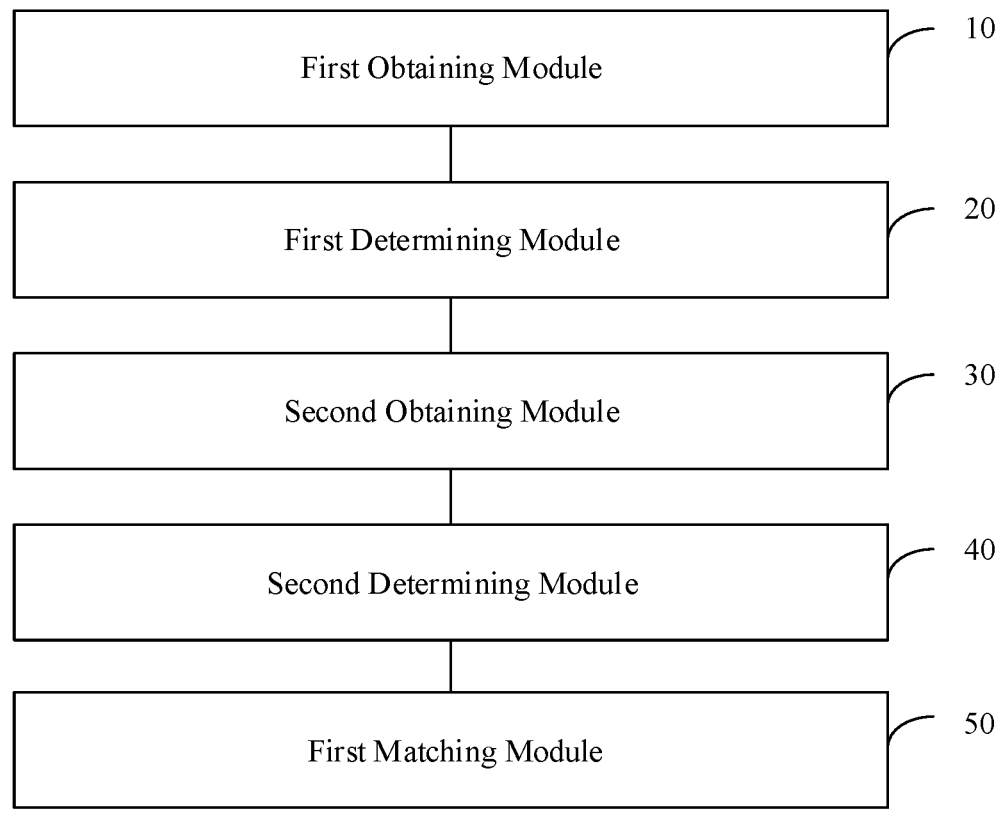
FIG. 7 is a block schematic view of an antenna matching method according to an embodiment of the present disclosure.

In an embodiment, as shown in FIG. 7, an antenna matching apparatus is provided, including a first obtaining module 10, a first determining module 20, a second obtaining module 30, a second determining module 40, and a matching module 50.

The first obtaining module 10 is configured to obtain status information of the mobile terminal, and determining whether the mobile terminal is currently in a communication state based on the status information.

The first determining module 20 is configured to determine an operation mode of the mobile terminal in the communication state, in response to determining that the mobile terminal is in the communication state.

The second obtaining module 30 is configured to obtain gesture data of a user for the mobile terminal by using a sensor detection module, in response to determining that the operation mode of the mobile terminal in the communication state is a first operation mode.

The second determining module 40 is configured to determine a holding gesture state of the user for the mobile terminal based on the gesture data;

The matching module 50 is configured to select a target antenna corresponding to the holding gesture state from the plurality of antennas based on the holding gesture state of the user for the mobile terminal.

Figure 8:
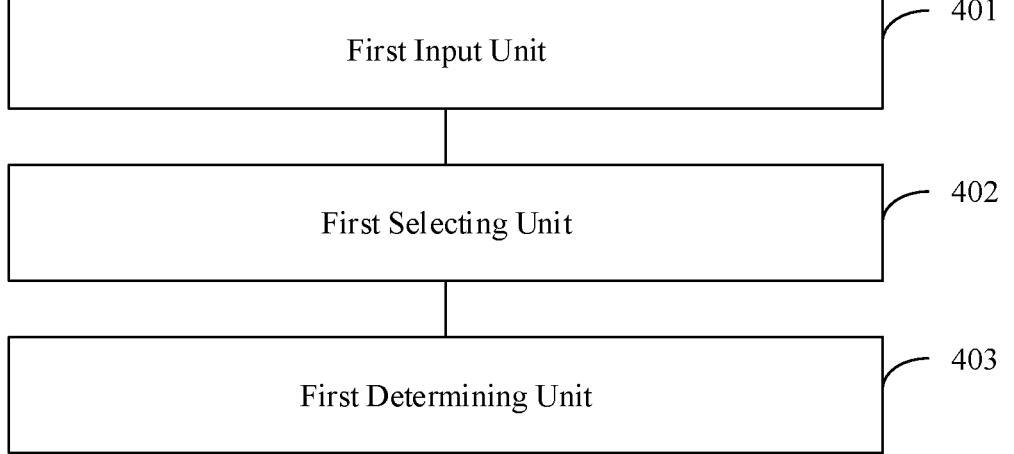
FIG. 8 is a flowchart of an antenna matching method according to an embodiment of the present disclosure.

Alternatively, as shown in FIG. 8, the second determining module 40 includes a first input unit 401, a first selecting unit 402, and a first determining unit 403.

The first input unit 401 is configured to input the gesture data into a preset gesture data template library;

The first selecting unit 402 is configured to select a target gesture template with highest matching degree with the gesture data from the gesture data template library. The target gesture template includes gesture motion information; and The first determining unit 403 is configured to determine the holding gesture state of the user for the mobile terminal based on the gesture action information.

Alternatively, the antenna matching apparatus further includes a second matching module.

The second matching module is configured to match a corresponding default antenna from the plurality of antennas according to the communication type of the mobile terminal if the operation mode of the mobile terminal in the com-munication state is the second operation mode.

Alternatively, the antenna matching apparatus further includes a second matching module.

The collecting module is configured to collect original gesture data, and perform denoising processing on the original gesture data to generate standard gesture data. The standard gesture data includes triaxial angular velocity data.

The extracting module is configured to extract active gesture data from the standard gesture data based on the triaxial angular velocity data.

The preprocessing module is configured to preprocess the active gesture data to generate sample gesture data.

The forming module is configured to form a gesture data template library based on the sample gesture data.

Alternatively, the preprocessing module includes a smoothing processing unit, a normalization processing unit, a cubic spline interpolation processing unit, and a false peak and valley processing unit.

The smoothing processing unit is configured to smooth the active gesture data.

The normalization processing unit is configured to perform normalization processing on smoothed active gesture data.

The cubic spline interpolation processing unit is config-ured to perform cubic spline interpolation processing on normalized active gesture data.

The false peak and valley processing unit is configured to perform false peak and valley processing on the active gesture data processed by the cubic spline interpolation processing to generate the sample gesture data.

Alternatively, the antenna matching apparatus further includes a second matching module.

The detection module is configured to detect a center frequency of a current communication signal of the mobile terminal.

The coupling module is configured to generate a control signal based on the center frequency, and coupling the control signal to the matching network connected to the target antenna. The matching network includes a plurality of switching switches; and The response module is configured to control a state of each switching switch in the matching network in response to the control signal so that a resonance frequency of the target antenna is adapted to the current communication signal of the mobile terminal.

For a specific description of the antenna matching appa-ratus, reference may be made to the above description of the antenna matching method, and details are not described herein. Each module in the antenna matching apparatus may be implemented in whole or in part by software, hardware, and combinations thereof. The above modules may be embedded in or independent of the processor in the mobile terminal in hardware, or may be stored in the memory in the mobile terminal in software, so that the processor can invoke and execute the operations corresponding to the respective modules.

Figure 9:
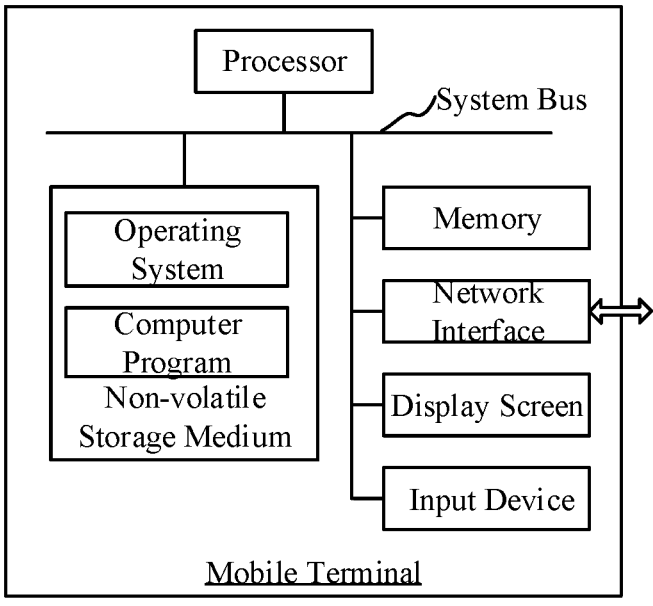
FIG. 9 is an internal block view of a mobile terminal according to an embodiment of the present disclosure.

In an embodiment, a mobile terminal is provided, which may include a mobile terminal, the internal structure of which may be shown in FIG. 9. The mobile terminal includes a processor, a memory, a network interface, a display screen, and an input device connected through a system bus. The processor of the mobile terminal is config-ured to provide computing and control capabilities. The memory of the mobile terminal includes a non-volatile storage medium and an internal memory. The non-volatile storage medium stores herein an operating system and a computer program. The internal memory provides an envi-ronment for the operation of an operating system and a computer program in a non-volatile storage medium. The network interface of the mobile terminal is used to commu-nicate with an external mobile terminal through a network connection. The computer program is executed by the pro-cessor to implement an antenna matching method. The display screen of the mobile terminal may be a liquid crystal display screen or an electronic ink display screen. The input device of the mobile terminal may be a touch layer covered on the display screen, or may be a key, a trackball or a touch pad provided on the housing of the mobile terminal, or may be an external keyboard, an external touch pad or an external mouse.

It will be appreciated by those skilled in the art that the structure shown in FIG. 9 is a block diagram of only part of the structure associated with the solution of the present disclosure, and does not limit the mobile terminal to which the solution of the present disclosure is applied. The terminal may include more or less components than illustrated, or may combine certain components, or different component arrangements.

In an embodiment, a mobile terminal is provided that includes a memory in which a computer program is stored and a processor that, when executing the computer program, performs the following operations:

obtaining status information of the mobile terminal, and determining whether the mobile terminal is currently in a communication state based on the status information;

in response to determining that the mobile terminal is in the communication state, determining an operation mode of the mobile terminal in the communication state;

in response to determining that the operation mode of the mobile terminal in the communication state is a first operation mode, obtaining gesture data of a user for the mobile terminal by using a sensor detection module;

determining a holding gesture state of the user for the mobile terminal based on the gesture data; and selecting a target antenna corresponding to the holding gesture state from the plurality of antennas based on the holding gesture state of the user for the mobile terminal.

An embodiment of the present application is directed to a computer readable storage medium having stored thereon a computer program executable by a processor to perform the following operations:

obtaining status information of the mobile terminal, and determining whether the mobile terminal is currently in a communication state based on the status information;

in response to determining that the mobile terminal is in the communication state, determining an operation mode of the mobile terminal in the communication state;

in response to determining that the operation mode of the mobile terminal in the communication state is a first operation mode, obtaining gesture data of a user for the mobile terminal by using a sensor detection module;

determining a holding gesture state of the user for the mobile terminal based on the gesture data; and selecting a target antenna corresponding to the holding gesture state from the plurality of antennas based on the holding gesture state of the user for the mobile terminal.

A person of ordinary skill in the art may understand that all or parts of the processes for implementing the methods of the above-described embodiments may be implemented by instructing relevant hardware by a computer program. The computer program may be stored in a non-volatile computer readable storage medium, and the computer program may, when executed, include the processes of the embodiments of the methods described above. Any reference to memory, storage, database, or other media in the embodiments provided herein may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is implemented in various forms, such as static RAM (SRAM), dynamic RAM (DRAM), synchronous DRAM (SDRAM), double data rate SDRAM (DDRS-DRAM), enhanced SDRAM (ESDRAM), synchronous link (Synchlink), DRAM (SLDRAM), memory bus (Rambus), direct RAM (RDRAM), direct memory bus dynamic RAM (DRDRAM), and memory bus dynamic RAM (RDRAM).

The technical features of the above embodiments may be arbitrarily combined. For the sake of brevity, all possible combinations of the technical features of the above embodiments are not described. However, as long as the combination of these technical features is not contradicted, it should be considered as the scope of the present specification.

The above-described examples represent only a few embodiments of the present disclosure, the description of which is more specific and detailed, but are not therefore to be construed as limiting the scope of present disclosure. It should be noted that, for those of ordinary skill in the art, several modifications and improvements may also be made without departing from the concept of the present disclosure. These fall within the scope of the present disclosure. Accordingly, the scope of the present disclosure shall be subject to the appended claims.

What is claimed is:

1. An antenna matching method, applied to a mobile terminal comprising a plurality of antennas, wherein the antenna matching method comprises:

obtaining status information of the mobile terminal, and determining whether the mobile terminal is currently in a communication state based on the status information;

in response to determining that the mobile terminal is in the communication state, determining an operation mode of the mobile terminal in the communication state;

in response to determining that the operation mode of the mobile terminal in the communication state is a first operation mode, obtaining gesture data of a user for the mobile terminal by using a sensor detection module;

determining a holding gesture state of the user for the mobile terminal based on the gesture data; and selecting a target antenna corresponding to the holding gesture state from the plurality of antennas based on the holding gesture state of the user for the mobile terminal; wherein the determining of the holding gesture state of the user for the mobile terminal based on the gesture data comprises:

inputting the gesture data into a preset gesture data template library;

selecting a target gesture template with highest matching degree with the gesture data from the gesture data template library, wherein the target gesture template comprises gesture action information; and determining a holding gesture state of the user for the mobile terminal based on the gesture action information.

2. The antenna matching method of claim 1, wherein the antenna matching method further comprises: after determining the operation mode of the mobile terminal in the communication state, in response to determining that the operation mode of the mobile terminal in the communication state is a second operation mode, selecting a default antenna corresponding to a communication type of the mobile terminal from the plurality of antennas based on the communication type of the mobile terminal.

3. The antenna matching method of claim 1, wherein the antenna matching method further comprises: before determining the holding gesture state of the user for the mobile terminal based on the gesture data, collecting original gesture data, and performing denoising processing on the original gesture data to generate standard gesture data, wherein the standard gesture data comprises triaxial angular velocity data;

extracting active gesture data from the standard gesture data based on the triaxial angular velocity data;

preprocessing the active gesture data to generate sample gesture data; and forming a gesture data template library based on the sample gesture data.

4. The antenna matching method of claim 3, wherein the preprocessing of the active gesture data to generate the sample gesture data comprises:

smoothing the active gesture data;

performing normalization processing on smoothed active gesture data;

performing cubic spline interpolation processing on normalized active gesture data; and performing false peak and valley processing on the active gesture data processed by the cubic spline interpolation processing to generate the sample gesture data.

5. The antenna matching method of claim 1, wherein the mobile terminal further comprises a matching network connected to the target antenna;

the antenna matching method further comprises: after selecting the target antenna corresponding to the holding gesture state from the plurality of antennas based on the holding gesture state of the user for the mobile terminal, detecting a center frequency of a current communication signal of the mobile terminal;

generating a control signal based on the center frequency, and coupling the control signal to the matching network connected to the target antenna, wherein the matching network comprises a plurality of switching switches; and controlling a state of each of the switching switches in the matching network in response to the control signal so that a resonance frequency of the target antenna is adapted to the current communication signal of the mobile terminal.

6. An antenna matching apparatus, comprising:

a first obtaining module, configured to obtain status information of the mobile terminal, and determining whether the mobile terminal is currently in a communication state based on the status information;

a first determining module, configured to determine an operation mode of the mobile terminal in the communication state, in response to determining that the mobile terminal is in the communication state;

a second obtaining module, configured to obtain gesture data of a user for the mobile terminal by using a sensor detection module, in response to determining that the operation mode of the mobile terminal in the communication state is a first operation mode;

a second determining module, configured to determine a holding gesture state of the user for the mobile terminal based on the gesture data; and a first matching module, configured to select a target antenna corresponding to the holding gesture state from the plurality of antennas based on the holding gesture state of the user for the mobile terminal; wherein the second determining module comprises:

a first input unit, configured to input the gesture data into a preset gesture data template library;

a first selecting unit, configured to select a target gesture template with highest matching degree with the gesture data from the gesture data template library, wherein the target gesture template comprises gesture motion information; and a first determining unit, configured to determine the holding gesture state of the user for the mobile terminal based on the gesture action information.

7. A mobile terminal comprising a memory storing a computer program and a processor, wherein the processor, when executing the computer program, performs the operations of:

obtaining status information of the mobile terminal, and determining whether the mobile terminal is currently in a communication state based on the status information;

in response to determining that the mobile terminal is in the communication state, determining an operation mode of the mobile terminal in the communication state;

in response to determining that the operation mode of the mobile terminal in the communication state is a first operation mode, obtaining gesture data of a user for the mobile terminal by using a sensor detection module;

determining a holding gesture state of the user for the mobile terminal based on the gesture data; and selecting a target antenna corresponding to the holding gesture state from the plurality of antennas based on the holding gesture state of the user for the mobile terminal; wherein the determining of the holding gesture state of the user for the mobile terminal based on the gesture data comprises:

inputting the gesture data into a preset gesture data template library;

selecting a target gesture template with highest matching degree with the gesture data from the gesture data template library, wherein the target gesture template comprises gesture action information; and determining a holding gesture state of the user for the mobile terminal based on the gesture action information.

8. The mobile terminal of claim 7, wherein the antenna matching method further comprises: after determining the operation mode of the mobile terminal in the communication state, in response to determining that the operation mode of the mobile terminal in the communication state is a second operation mode, selecting a default antenna corresponding to a communication type of the mobile terminal from the plurality of antennas based on the communication type of the mobile terminal.

9. The mobile terminal of claim 7, wherein the antenna matching method further comprises: before determining the holding gesture state of the user for the mobile terminal based on the gesture data, collecting original gesture data, and performing denoising processing on the original gesture data to generate standard gesture data, wherein the standard gesture data comprises triaxial angular velocity data;

extracting active gesture data from the standard gesture data based on the triaxial angular velocity data;

preprocessing the active gesture data to generate sample gesture data; and forming a gesture data template library based on the sample gesture data.

10. The mobile terminal of claim 9, wherein the preprocessing of the active gesture data to generate the sample gesture data comprises:

smoothing the active gesture data;

performing normalization processing on smoothed active gesture data;

performing cubic spline interpolation processing on normalized active gesture data; and performing false peak and valley processing on the active gesture data processed by the cubic spline interpolation processing to generate the sample gesture data.

11. The mobile terminal of claim 7, wherein the mobile terminal further comprises a matching network connected to the target antenna;

the antenna matching method further comprises: after selecting the target antenna corresponding to the holding gesture state from the plurality of antennas based on the holding gesture state of the user for the mobile terminal, detecting a center frequency of a current communication signal of the mobile terminal;

generating a control signal based on the center frequency, and coupling the control signal to the matching network connected to the target antenna, the matching network comprising a plurality of switching switches; and controlling a state of each of the switching switches in the matching network in response to the control signal so that a resonance frequency of the target antenna is adapted to the current communication signal of the mobile terminal.

\* \* \* \* \*